(12) United States Patent
Ucar et al.

(10) Patent No.: US 12,288,462 B2
(45) Date of Patent: Apr. 29, 2025

(54) RE-IDENTIFICATION AND REVOCATION FOR MISBEHAVING VEHICLE DETECTION

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Baik Hoh, Mountain View, CA (US); Onur Altintas, Mountain View, CA (US); Kentaro Oguchi, Mountain View, CA (US)

(*) Notice: Subject to any disclaimer, the term of this patent is extended or adjusted under 35 U.S.C. 154(b) by 237 days.

(21) Appl. No.: 16/943,456

(22) Filed: Jul. 30, 2020

(65) Prior Publication Data

US 2022/0036728 A1 Feb. 3, 2022

(51) Int. Cl.
| | |
|---|---|
| G08G 1/01 | (2006.01) |
| G07C 5/08 | (2006.01) |
| G08G 1/017 | (2006.01) |
| H04W 4/44 | (2018.01) |

(52) U.S. Cl.
CPC ......... *G08G 1/0141* (2013.01); *G07C 5/0808* (2013.01); *G07C 5/0816* (2013.01); *G08G 1/0112* (2013.01); *G08G 1/0133* (2013.01); *G08G 1/017* (2013.01); *H04W 4/44* (2018.02)

(58) Field of Classification Search
CPC .. G08G 1/0141; G08G 1/0112; G08G 1/0133; G08G 1/017; G08G 1/205; G07C 5/0808; G07C 5/0816; H04W 4/44; H04W 4/40; H04W 4/90; H04L 67/10
See application file for complete search history.

(56) References Cited

U.S. PATENT DOCUMENTS

| 9,672,734 B1 | 6/2017 | Ratnasingam |
| 10,334,405 B2 | 6/2019 | Altintas et al. |
| 2017/0293296 A1* | 10/2017 | Stenneth ........... G06Q 10/06315 |

(Continued)

OTHER PUBLICATIONS

Hagenauer et al., "Vehicular Micro Clouds as Virtual Edge Servers for Efficient Data Collection," Oct. 20, 2017 (Year: 2017).*

(Continued)

*Primary Examiner* — Aniss Chad
*Assistant Examiner* — Stephanie T Su
(74) *Attorney, Agent, or Firm* — Burbage Law, P.C.; Jon-Michael Burbage

(57) ABSTRACT

The disclosure includes embodiments re-identification and revocation for misbehaving vehicle detection. A misbehaving vehicle is an example of an anomaly. A method includes receiving from a vehicular micro cloud, by a connected vehicle that is a member of the vehicular micro cloud, vehicular micro cloud data describing an anomaly and a first state of the anomaly in a geographic area. The method includes causing a sensor to record sensor data describing the geographic area. The method includes determining, based on the sensor data and the vehicular micro cloud data, whether the anomaly is still present and in the first state. The method includes generating evidence data describing a second state of the anomaly. The method includes transmitting the evidence data to the vehicular micro cloud. The method includes modifying an operation of the connected vehicle based on the evidence data.

20 Claims, 6 Drawing Sheets

(56) References Cited

U.S. PATENT DOCUMENTS

| | | | |
|---|---|---|---|
| 2020/0259820 A1* | 8/2020 | McCall | H04L 9/3239 |
| 2020/0280842 A1* | 9/2020 | Liu | H04L 9/3268 |
| 2021/0179133 A1* | 6/2021 | Yetukuri | G08G 1/09623 |
| 2021/0319332 A1* | 10/2021 | Isaac | G06N 20/00 |

OTHER PUBLICATIONS

K. Kaur, S. Garg, G. S. Aujla, N. Kumar, J. J. P. C. Rodrigues and M. Guizani, "Edge Computing in the Industrial Internet of Things Environment: Software-Defined-Networks-Based Edge-Cloud Interplay," in IEEE Communications Magazine, vol. 56, No. 2, pp. 44-51, Feb. 2018, doi: 10.1109/MCOM.2018.1700622. (Year: 2018).*

Cloudfare, "What is the cloud?," Aug. 15, 2019 (Year: 2019).*

Wang, S., Tu, G. H., Ganti, R., He, T., Leung, K., Tripp, H., . . . & Zafer, M. (Oct. 2013). Mobile micro-cloud: Application classification, mapping, and deployment. In Proc. Annual Fall Meeting of ITA (AMITA). (Year: 2013).*

Free On-Line Dictionary of Computing (FOLDOC). "Server" (Year: 2003).*

Lee, Euisin et al., "Vehicular Cloud Networking: Architecture and Design Principles," IEEE Communications Magazine, Feb. 2014, pp. 148-155.

Sanati, Jennifer, "Top 10 Reasons to Setup a Client-Server Network," retrieved from Internet: https://itpeernetwork.intel.com/top-10-reasons-to-setup-a-client-server-network/#gs.fnkxi2, May 2, 2011, 5 pages.

Jiru, Josef et al., "Data Aggregation in VANATs: a generalized framework for channel load adaptive schemes," 39th Annual IEEE Conference on Load Computer Networks, 2014, pp. 394-397.

Lim, Jay W. Y. et al., "Performance Analysis of Parallel Computing in Distributed Overlay Network," IEEE TENCON 2011, 2011, pp. 1404-1408.

* cited by examiner

RE-IDENTIFICATION AND REVOCATION FOR MISBEHAVING VEHICLE DETECTION

BACKGROUND

The specification relates to re-identification and revocation for misbehaving vehicle detection. Some embodiments relate to a vehicle system of a connected vehicle that re-identifies a vehicle previously identified as misbehaving and then revokes the label of this vehicle as misbehaving if appropriate.

Modern vehicles include Adaptive Driver Assistance Systems (herein "ADAS systems") or automated driving systems. An automated driving system is a collection of ADAS systems which provides sufficient driver assistance that a vehicle is autonomous. ADAS systems and automated driving systems are referred to as "vehicle control systems."

A particular vehicle that includes these vehicle control systems is referred to herein as an "ego vehicle" and other vehicles in the vicinity of the ego vehicle are referred to as "remote vehicles."

Modern vehicles collect a lot of data describing their environment. An ego vehicle uses this image data to understand their environment and operate their vehicle control systems (e.g., ADAS systems or automated driving systems).

Connected vehicles form clusters of interconnected vehicles (e.g., via vehicle-to-everything, i.e., "V2X") that are located at a similar geographic location. Distributed data storage and computing by a cluster of connected vehicles is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using clusters removes the need for connected vehicles to access remote cloud servers or edge servers by vehicle-to-network (V2N) communications (e.g., by cellular networks) whenever they need to get access to computing resources such as shared data (e.g., high-definition road map for automated driving), shared computational power, and cloudification services.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving from a vehicular micro cloud, by a connected vehicle that is a member of the vehicular micro cloud, vehicular micro cloud data describing an anomaly and a first state of the anomaly in a geographic area; causing a sensor to record sensor data describing the geographic area; determining, based on the sensor data and the vehicular micro cloud data, whether the anomaly is still present and in the first state; generating evidence data describing a second state of the anomaly; transmitting the evidence data to the vehicular micro cloud; and modifying an operation of the connected vehicle based on the evidence data. Other embodiments of this aspect include corresponding computer systems, apparatus, and computer programs recorded on one or more computer storage devices, each configured to perform the actions of the methods.

Implementations may include one or more of the following features. The method where the first state includes the anomaly being present in the geographic area and the second state includes the anomaly not being present in the geographic area. The method where the first state includes a first type of anomaly and the second state includes a second type of anomaly that is different than the first type. The method where the first state includes a first severity of the anomaly and the second state includes a second severity of the anomaly that is different than the first severity. The method where the vehicular micro cloud is non-inclusive of a vehicular ad hoc network. The method where the evidence data is generated by only the connected vehicle so that the evidence data is generated non-inclusive of cooperative computing. The method where transmitting the evidence data to the vehicular micro cloud includes revising the micro cloud data based on the evidence data and propagating the revised micro cloud data to members of the vehicular micro cloud. The method where the connected vehicle is a leader of the vehicular micro cloud. The method where the leader executes the method to benefit members of the vehicular micro cloud. The method further including determining that execution of the method satisfies a threshold for latency for executing the method. Implementations of the described techniques may include hardware, a method or process, or computer software on a computer-accessible medium.

Cooperative computing includes multiple endpoints of the network collaboratively breaking large tasks down into smaller processes, executing processes to determine results, and exchanging V2X messages sharing these results with one another so that multiple endpoints work together to complete the large tasks. This approach is undesirable because it creates latency.

One general aspect includes a computer program product included in at least one onboard vehicle computer for modifying an operation of a connected vehicle based on evidence data, the computer program product including computer code that is operable, when executed by the onboard vehicle computer, to cause the onboard vehicle computer to execute steps including: receive from a vehicular micro cloud, by the connected vehicle that is a member of the vehicular micro cloud, vehicular micro cloud data describing an anomaly and a first state of the anomaly in a geographic area; cause a sensor to record sensor data describing the geographic area; determine, based on the sensor data and the vehicular micro cloud data, whether the anomaly is still present and in the first state; generate the evidence data describing a second state of the anomaly; transmit the evidence data to the vehicular micro cloud; and modify an operation of the connected vehicle based on the evidence data. Other embodiments of this aspect include corresponding computer systems, apparatus, and computer programs recorded on one or more computer storage devices, each configured to perform the actions of the methods.

Implementations may include one or more of the following features. The computer program product where the first state includes the anomaly being present in the geographic area and the second state includes the anomaly not being present in the geographic area. The computer program product where the first state includes a first type of anomaly and the second state includes a second type of anomaly that is different than the first type. The computer program product where the first state includes a first severity of the anomaly and the second state includes a second severity of the anomaly that is different than the first severity. The computer program product where the vehicular micro cloud is non-inclusive of a vehicular ad hoc network. The computer program product where the evidence data is generated by only the connected vehicle so that the evidence data is generated non-inclusive of cooperative computing. The computer program product where transmitting the evidence data to the vehicular micro cloud includes revising the micro cloud data based on the evidence data and propagating the revised micro cloud data to members of the vehicular micro cloud. The computer program product where the connected vehicle is a leader of the vehicular micro cloud. The computer program product where the leader executes the steps to benefit members of the vehicular micro cloud. Implementations of the described techniques may include hardware, a method or process, or computer software on a computer-accessible medium.

One general aspect may include a system included in a connected vehicle for modifying an operation of the connected vehicle based on evidence data, the system including: a processor; a communication unit communicatively coupled to the processor; and a non-transitory memory communicatively coupled to the processor and the communication unit, where the non-transitory memory stores executable code that is operable, when executed by the processor, to cause the processor to: receive from a vehicular micro cloud, by a connected vehicle that is a member of the vehicular micro cloud, vehicular micro cloud data describing an anomaly and a first state of the anomaly in a geographic area; cause a sensor to record sensor data describing the geographic area; determine, based on the sensor data and the vehicular micro cloud data, whether the anomaly is still present and in the first state; generate evidence data describing a second state of the anomaly; transmit the evidence data to the vehicular micro cloud; and modify an operation of the connected vehicle based on the evidence data. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Modern vehicles include ADAS systems or automated driving systems. These systems are referred to herein collectively or individually as "vehicle control systems."

Figure 1:
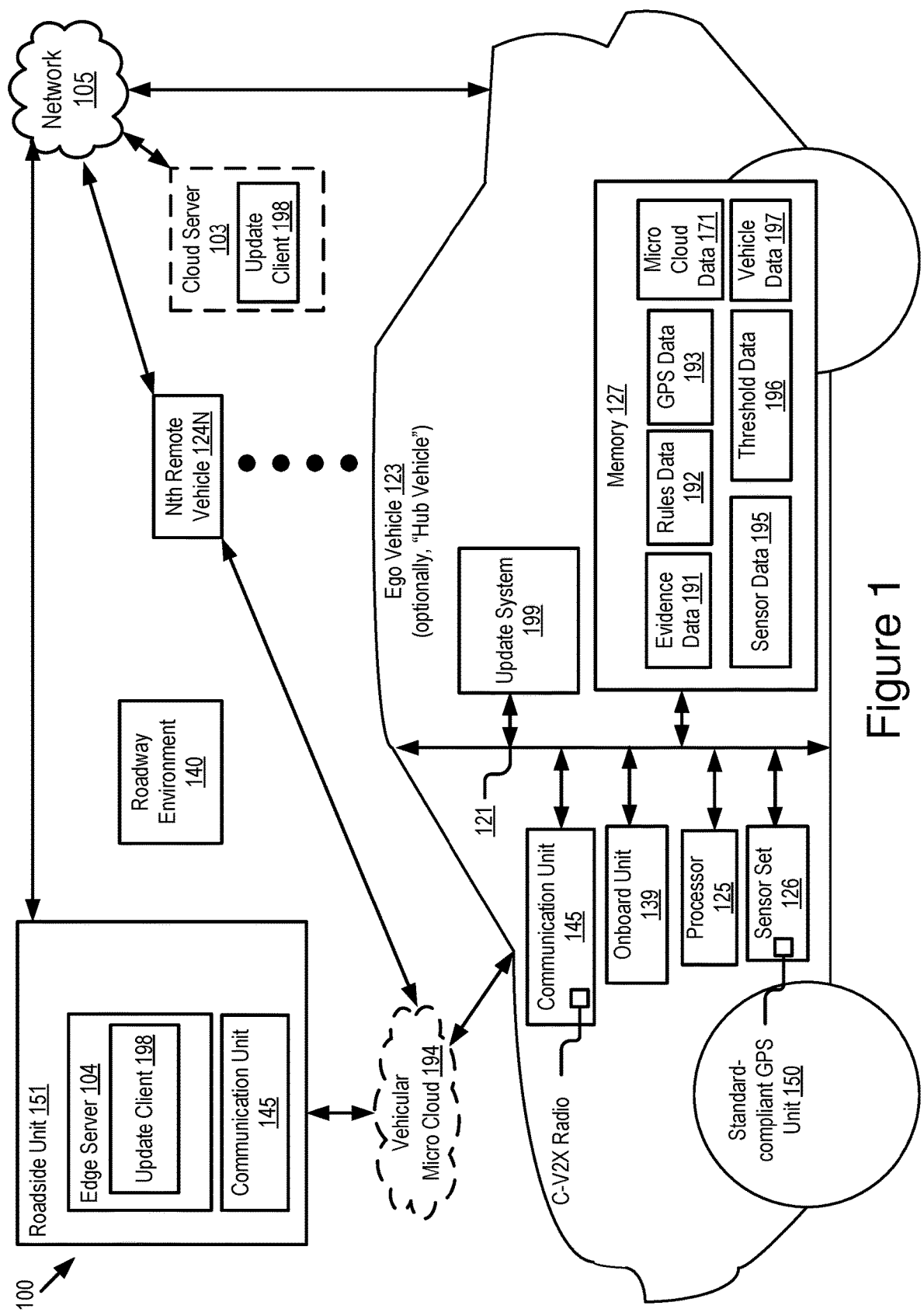
FIG. 1 is a block diagram illustrating an operating environment for an update system and an update client according to some embodiments.

A particular vehicle that includes these vehicle control systems is referred to herein as an "ego vehicle" and other vehicles in the vicinity of the ego vehicle as "remote vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

Distributed data storage and computing by a cluster of connected vehicles (i.e., a "vehicular micro cloud") is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to computing resources such as shared data (e.g., high-definition road map for automated driving), shared computational power, and cloudification services.

What is an Anomaly?

Sometimes a vehicle sensor records sensor data describing an anomaly. As used herein, the terms "anomaly" and "anomalous behavior" refer to the same thing. An anomaly includes an action done in an unusual time or an unusual location relative to actions historically observed by a vehicle sensor. For example, an anomaly includes a particular action done and observed by a vehicle sensor at a particular location, and this particular action is unusual because it has not been observed before at this location or has not frequently been observed at this location relative to some threshold for frequency.

In some embodiments, vehicles share digital data with one another via V2V communications and this digital data describes observed anomalies which the vehicles then use to judge whether an observed behavior is an anomalous behavior.

In some embodiments, an anomaly is classified as one or more of the following types of anomalies: a human anomaly; a data anomaly; a road surface anomaly; and a traffic anomaly.

A human anomaly includes an anomalous action by a human. An example of a human anomaly includes a pedestrian screaming.

A data anomaly includes inaccurate sensor data being reported to other vehicles via V2X communication. For example, vehicles routinely transmit sensor data to one another via Basic Safety Messages ("BSMs" or "BSM messages") that are broadcast by the vehicles. These BSMs include sensor data in their payload. If this sensor data is false or inaccurate, then this is an example of a data anomaly. For example, if a BSM includes sensor data that inaccurately describes a vehicle's acceleration information in platooning, then this is an example of a data anomaly.

A road surface anomaly includes a defect in a road surface. The defect can be static or dynamic. For example, a pothole is an example of a static road surface anomaly because the pothole does not move and generally stays the same over time. An example of a dynamic road surface anomaly includes pooled water on the road surface because the water will evaporate, seep, or runoff over time.

A traffic anomaly includes anomalous traffic flow. For example, a lane merge from the wrong side is an example of a traffic anomaly. Another example of a lane merge is a lane closure. Yet another example is a traffic accident or roadway construction.

The Latency Problem

A solution for detecting anomalies is described in U.S. patent application Ser. No. 16/273,134 filed on Feb. 11, 2019 and entitled "Anomaly Mapping by Vehicular Micro Clouds," the entirety of which is hereby incorporated by reference. This patent application is hereby referred to as the '134 patent application. A problem is that the embodiments of the '134 patent application introduce latency into the process by requiring that anomalies be detected in a collaborative fashion among sets of vehicles (e.g., vehicular micro clouds). This latency is unacceptable in some situations which require minimal latency. This latency is referred to herein as "the latency problem."

Described herein are embodiments of an update system and embodiments of an update client. These embodiments work together to provide numerous benefits, including solving the latency problem, as well as others. In some embodiments, the update system is an element of a connected vehicle that is also a member of a vehicular micro cloud, while the update client is an element of a server. For example, the update client is an element of an edge server that is installed in a roadside device such as a roadside unit (RSU). In another example, the update client is an element of a cloud server.

In some embodiments, one or more of the update client and the update system are configured as a lightweight system. For example, the update system and/or the update client is a software system that is configured to use an amount of processor bandwidth and memory that satisfies a predetermined threshold that classifies the update system as a lightweight system. In some embodiments, the threshold is described by threshold data. The threshold data includes digital data that describes some or all of the thresholds described herein. An example of the threshold data according to some embodiments includes the threshold data 196 depicted in FIG. 1.

In some embodiments, the update system includes code and routines that are operable, when executed by a processor of a connected vehicle which includes the update system, to reduce latency by leveraging data sets generated by vehicular micro clouds (herein "micro cloud data") to help individual vehicles (which may or may not be members of the vehicular micro clouds) to identify anomalies as they are approaching a geographical area.

The micro cloud data includes digital data collected by the members of the vehicular micro cloud. In some embodiments, the micro cloud data is digital data that describes the location of anomalies, the type of anomaly, the severity of the anomaly, and other identifying information about the anomaly. In some embodiments, the update system builds the micro cloud data, and some or all of the vehicles that are members of the vehicular micro cloud also include an update system which is utilized by them to build the micro cloud data. In some embodiments, inclusion of an instance of an update system is a requirement for membership in the vehicular micro cloud. For example, a hub of the vehicular micro cloud will not permit a vehicular to join the vehicular micro cloud if it does not include an update system and provide micro cloud data (or vehicle data) to the update client.

In some embodiments, as described below with reference to step 2 of the example general method, the update system causes the sensors of the vehicle that includes the update system to build vehicle data and then cause the communication of this vehicle to transmit the vehicle data to the server that includes the update client. The update client aggregates instances of vehicle data from many different vehicles and then uses this aggregated data to generate the micro cloud data.

The update client stores micro cloud data and/or vehicle data that is provided to it by the members of a vehicular micro cloud. The update client distributes the micro cloud data to individual vehicles. The individual vehicles include an instance of the update system. The update systems of the individual vehicles use their own sensor measurements to analyze the micro cloud data relative to their stored senor measurements to individually confirm whether the anomalies described by the micro cloud data is still accurate.

In some embodiments, the individual vehicles are members of the vehicular micro cloud. In some embodiments, some or all of the individual vehicles are not members of the vehicular micro cloud. In some embodiments, an RSU that includes the edge server that includes the update client is also the hub of the vehicular micro cloud. In some embodiments, an ego vehicle as described herein is the hub of the vehicular micro cloud.

Solution to the Latency Problem

The above-described functionality provided by the update system and the update client minimizes latency because it does not require collaborative computing among the individual vehicles that receive the micro cloud data. For example, if a first individual vehicle determines that the micro cloud data is inaccurate, the first individual vehicle does not need to confirm this determination with the other individual vehicles before it updates its own stored micro cloud data or takes action responsive to the determination of inaccuracy. By comparison, in some embodiments the technology described '134 patent requires such confirmation among the individual vehicles, which results in unacceptable latency in some situations.

As described herein, vehicles that are approaching geographic areas where anomalies have been detected as "approaching vehicles" and data sets generated by micro vehicular clouds and describing anomalies as "micro cloud data."

In some embodiments, the update system enables approaching vehicles to update the micro cloud data based on their own observations (e.g., sensor measurements by their onboard sensor set) of geographic areas where anomalies where previously detected. For example, the update system enables approaching vehicles to provide evidence (e.g., evidence data) that revokes the designation of a geographic area as including some or all anomalies that were previously reported for this geographic area in the micro cloud data distributed by the update client.

Example General Method

An example general method is now described. The example general method may be better understood by reference to FIG. 1, which is described in detail below.

In some embodiments, the update system is software installed in an onboard unit (e.g., an electronic control unit (ECU)) of a connected vehicle (e.g., the ego vehicle) having V2X communication capability. A remote vehicle is a different connected vehicle. In some embodiments, the remote vehicle also includes an instance of the update system.

With reference to FIG. 1, in some embodiments the "Nth remote vehicles" are a set of connected vehicles that are members of the same vehicular micro cloud as the ego vehicle, although this is not a requirement of all the embodiments described herein.

In some embodiments, the update system (e.g., of the ego vehicle) receives micro cloud data from a server (e.g., an edge server or a cloud server). The sever includes software (herein an "update client") that is responsible for aggregating micro cloud data, tracking the geographic locations of vehicles such as the ego vehicle, and providing micro cloud to the ego vehicle that corresponds to its geographic location. In this way, the update system of the ego vehicle receives micro cloud data that purports to describe anomalies for the geographic area being approached by the ego vehicle.

It is a requirement that the ego vehicle and the remote vehicles be connected vehicles having a communication unit which enables them to send and receive V2X wireless messages. Accordingly, as used herein, the term "vehicle" refers to a connected vehicle.

In some embodiments, the update system includes code and routines that are operable, when executed by the onboard unit, to cause the onboard unit to execute one or more steps of the following example general method. In some embodiments, these steps are executed in a different order. In some embodiments, some of these steps are skipped.

Step 1: The update system of the ego vehicle includes code and routines that are operable, when executed by a processor of the ego vehicle, to cause the processor to execute steps to form a vehicular micro cloud. This step is background technology described in U.S. Pat. No. 10,334,405 filed on Oct. 31, 2017 and entitled "IDENTIFYING A GEOGRAPHIC LOCATION FOR A STATIONARY MICRO-VEHICULAR CLOUD," the entirety of which is hereby incorporated by reference. Accordingly, this step is not described in detail herein. The vehicles that form the vehicular micro cloud are referred to as "members" of the vehicular micro cloud. The members exchange V2V messages or V2X messages with one another.

Step 2: The update system of the ego vehicle includes code and routines that are operable, when executed by a processor of the ego vehicle, to cause the processor to execute steps that the ego vehicle to transmit vehicle data to the server. For example, a communication unit of the ego vehicle transmits a V2X message that includes the vehicle data in the payload of the V2X message. In some embodiments, this V2X message is unicast to the server that includes the update client and received by this server so that the update client receives the vehicle data. In some embodiments, this V2X message is broadcast so that the update client receives the vehicle data.

In some embodiments, the vehicle data includes digital data that describes location data, heading data, path history data, etc. of the ego vehicle. An example of the vehicle data according to some embodiments includes the vehicle data 197 depicted in FIG. 1.

In some embodiments, the vehicle data is generated based on sensor data. The sensor data is digital data that describes the sensor measurements recorded by the sensor set of the ego vehicle. An example of the sensor data according to some embodiments includes the sensor data 195 depicted in FIG. 1.

Step 3. The update client receives N instances of vehicle data from N vehicles including the ego vehicle. As used herein, N refers to a positive whole number greater than one. The update client of the server (the edge server or the cloud server) includes code and routines that are operable, when executed by a processor of the server, to cause the processor to analyze the instances of vehicle data it has received and generate the micro cloud data based on these instances of vehicle data. The micro cloud data includes digital data that describes the anomalies of geographic area being approached by the ego vehicle. An example of the micro cloud data according to some embodiments includes the micro cloud data 171 depicted in FIG. 1. In some embodiments, an anomaly includes an action done in an unusual time or an unusual location. Examples of an anomaly include one or more of the following: a human anomaly; a data anomaly; a road surface anomaly; and a traffic anomaly.

Step 4: The update client of the server (includes code and routines that are operable, when executed by a processor of the server, to cause the processor to control the operation of the communication unit of the server to cause the communication unit to transmit micro cloud data to the ego vehicle. In some embodiment, this transmission includes a V2X message that includes the micro cloud data as its payload. In some embodiment, each member of the vehicular micro cloud receives a similar transmission. In some embodiments, this transmission is broadcast. In this way the members of the vehicular micro cloud receive the micro cloud data that they then use to assess their environment for anomalies.

Step 5: The update system of the ego vehicle includes code and routines that are operable, when executed by a processor of the ego vehicle, to cause the processor to control the operation of the onboard sensors of the ego vehicle (e.g., the sensor set) to cause these onboard sensors to collect sensor data. An example of the sensor data according to some embodiments includes the sensor data 195 depicted in FIG. 1.

In some embodiments, the sensor data includes digital data that describes one or more of the following sensor measurements about the geographic area where the ego vehicle is traveling: images; locations of objects; types of the objects (as indicated by object priors and/or anomaly rules); behavior of the objects (as indicated by object priors and/or anomaly rules); whether the objects are misbehaving or not (as indicated by object priors and/or anomaly rules); a severity of the misbehavior, if any (again, as indicated by object priors and/or anomaly rules); uniquely identifying information of the object, if any; the speeds of the objects; the headings of the objects; the accelerations of the objects; and the path histories of the objects.

Rules data includes digital data that describes the object priors and the anomaly rules. An example of the rules data according to some embodiments includes the rules data 192 depicted in FIG. 1. The object priors and anomaly rules are now described according to some embodiments.

The object priors include digital data (e.g., image data) that describe examples of types of objects, misbehavior by objects, ways of distinguishing between the severity of different types of misbehavior, and ways to uniquely identify objects (e.g., license plates, etc.).

The anomaly rules include digital data that describe features that can be compared to the sensor data by the update system to enable the update system to identify, within the measurements and images described by the sensor data, one or more of the following: the presence of an object; the type of the object; whether the object is engaging in what is classified as misbehavior or anomalous behavior; degrees of severity among different instances of the same type of misbehavior or anomalous behavior; and ways of uniquely identifying unique objects.

In some embodiments, the update system includes code and routines that are operable to analyze the sensor data in view of the anomaly rules and then classify the type and severity of the anomalies as well as the object in the environment that is causing the anomalous behavior.

In some embodiments, examples of features that are used by the anomaly rules include, but are not limited to, one or more of the following: a type of object causing an anomaly; a type of the anomaly; one or more conditions or states of the anomaly; one or more conditions or states of the object causing the anomaly; a type of a road where the anomaly occurs (e.g., a country road where an anomaly such as wild animals walking on the road can be detected); one or more potential locations of the anomaly (e.g., a trajectory of a moving anomaly); and one or more actions to take in case of an occurrence of an anomaly (e.g., one or more actions to take against the anomaly or to mitigate the anomaly).

A state of the anomaly includes digital data describing one or more of the following about the anomaly: the current location, heading, velocity, acceleration, path history, type of anomalous behavior, severity of the anomalous behavior, a time when the anomalous behavior was observed, and any other information that describes the anomaly and can be measured by the sensor set or determined based on analysis of the sensor data.

A state of the object includes digital data describing one or more of the following about the object: the current location, heading, velocity, acceleration, path history, type of object, uniquely identifying information for the object, a time when the object was observed at the current location, and any other information that describes the object and can be measured by the sensor set or determined based on analysis of the sensor data.

Step 6: The update system of the ego vehicle includes code and routines that are operable, when executed by a processor of the ego vehicle, to cause the processor to analyze the sensor data to determine if the misbehaving objects/anomalies described by the micro cloud data are present in the geographic area as indicated by the sensor data recorded by the sensor set of the ego vehicle. The focus of this step is determining the presence of the object causing the anomalous behavior, and not determining whether the object is still misbehaving. In some embodiments, steps 6-9 do not include any collaborative computing so that the ego vehicle executes these steps by itself and not in conjunction or cooperation with any other endpoint of the network.

Step 7: The update system of the ego vehicle includes code and routines that are operable, when executed by a processor of the ego vehicle, to cause the processor to analyze the sensor data to determine if the present objects/anomalies are still misbehaving. The focus of this step is determining the if the object is still displaying anomalous behavior. By executing the combination of steps 6 and 7, the update system effectively determines if the objects and anomalies which were present at the time that the micro cloud data was created are still present or become non-anomalous.

Step 8: The update system of the ego vehicle includes code and routines that are operable, when executed by a processor of the ego vehicle, to cause the processor to determine if the objects presently detected by the update system (and described by the sensor data) are still misbehaving with a same severity as reported in the micro cloud data.

Step 9: The update system of the ego vehicle includes code and routines that are operable, when executed by a processor of the ego vehicle, to cause the processor to generate evidence data. The evidence data is digital data describing variances between the sensor data and the micro cloud data as well as the sensor measurements which support a determination that the micro cloud data should be revised accordingly. An example of the evidence data according to some embodiments includes the evidence data 191 depicted in FIG. 1.

In some embodiments, step 9 includes generating evidence data that supports a conclusion that misbehaving objects or anomalies are still present and describes additional information about them such as the type of behavior, severity, location, identifying information, etc.

Step 10: The update system of the ego vehicle includes code and routines that are operable, when executed by a processor of the ego vehicle, to cause the processor to control the operation of the communication unit to transmit V2X messages including the evidence data as the payload for the V2X messages to other endpoints (other micro cloud members, the server, etc.). In some embodiments, this step is executed by broadcasting a single V2X message. In some embodiments, this step is executed by unicasting individual V2X messages to the different endpoints.

Step 11: The update system of the ego vehicle includes code and routines that are operable, when executed by a processor of the ego vehicle, to cause the processor to receive evidence data from other endpoints. For example, the ego vehicle includes a communication unit and the processor controls the operation of the communication unit so that the communication unit receives a V2X message including the evidence data generated by other endpoints (e.g., one or more of the remote vehicles) including an instance of the update system which generates the evidence data received from these endpoints at this step. The evidence data is included in the payload for the V2X message.

Step 12: The update system of the ego vehicle includes code and routines that are operable, when executed by a processor of the ego vehicle, to cause the processor to receive digital data describing input from the update client indicating a second opinion about whether the evidence data is accurate or, optionally, evidence data which has been determined by the update client based on various instances of evidence data received by the update client from the vehicular micro cloud. For example, the ego vehicle includes a communication unit and the processor controls the operation of the communication unit so that the communication unit receives a V2X message including the digital data generated by the update client. The update client includes code and routines that are operable to generate this digital data, which may be referred to as input data, based on the evidence data received from multiple endpoints such as the ego vehicle and the remote vehicles. The input data is included in the payload of the V2X message transmitted by the update client.

Step 13: The update system of the ego vehicle includes code and routines that are operable, when executed by a processor of the ego vehicle, to cause the processor to determine, based on all the evidence data received up to this point, as well as any other data from the server received at step 12, revisions for the micro cloud data. The revisions describe the correct state of the environment based on the evidence data.

Step 14: The update system of the ego vehicle includes code and routines that are operable, when executed by a processor of the ego vehicle, to cause the processor to update the micro cloud data based on the revisions so that the micro cloud data reflects the revisions and is consistent with the evidence data.

Step 15: The update system of the ego vehicle includes code and routines that are operable, when executed by a processor of the ego vehicle, to cause the processor to propagate the revised micro cloud data to other vehicles approaching the same geographic area described by the revised micro cloud data (this propagation may be direct V2V communication, through the vehicular micro cloud, or through the server).

Vehicle Cloudification

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "computational tasks."

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

Vehicular micro clouds are not an essential part of the embodiments described herein. Some embodiments do not include a vehicular micro cloud.

In some embodiments, the communication unit of an ego vehicle includes a V2X radio. The V2X radio operates in compliance with a V2X protocol. In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol.

In some embodiments, the pedestrian data is digital data that describes, among other things, images of a roadway environment as captured by the camera of the pedestrian device.

As used herein, the term "vehicle" refers to a connected vehicle. For example, the ego vehicle and remote vehicle depicted in FIG. 1 are connected vehicles. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

In some embodiments, the update system improves the performance of a network because it beneficially takes steps to reduce or eliminate the latency problem described above.

In some embodiments, the update system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; an edge server; and a roadside unit. For the purpose of clarity, the N remote vehicles may be referred to herein as the "remote vehicle" or the "remote vehicles" and this will be understood to describe N remote vehicles.

An example of a roadway environment according to some embodiments includes the roadway environment 140 depicted in FIG. 1. As depicted, the roadway environment 140 includes objects. Some of these objects may be engaged in anomalous behavior. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a GPS unit that has lane-level accuracy and a DSRC radio that is capable of transmitting DSRC messages.

In some embodiments, the ego vehicle and some or all of the remote vehicles include their own instance of an update system. For example, in addition to the ego vehicle, some or all of the remote vehicles include an onboard unit having an instance of the update system installed therein.

Accordingly, multiple instances of the update system are installed in a group of connected vehicles. The group of connected vehicles may be arranged as a vehicular micro cloud or some other vehicular cloud. In some embodiments, the ego vehicle and one or more of the remote vehicles are members of a vehicular micro cloud. In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 1.

Hub

Figure 3:
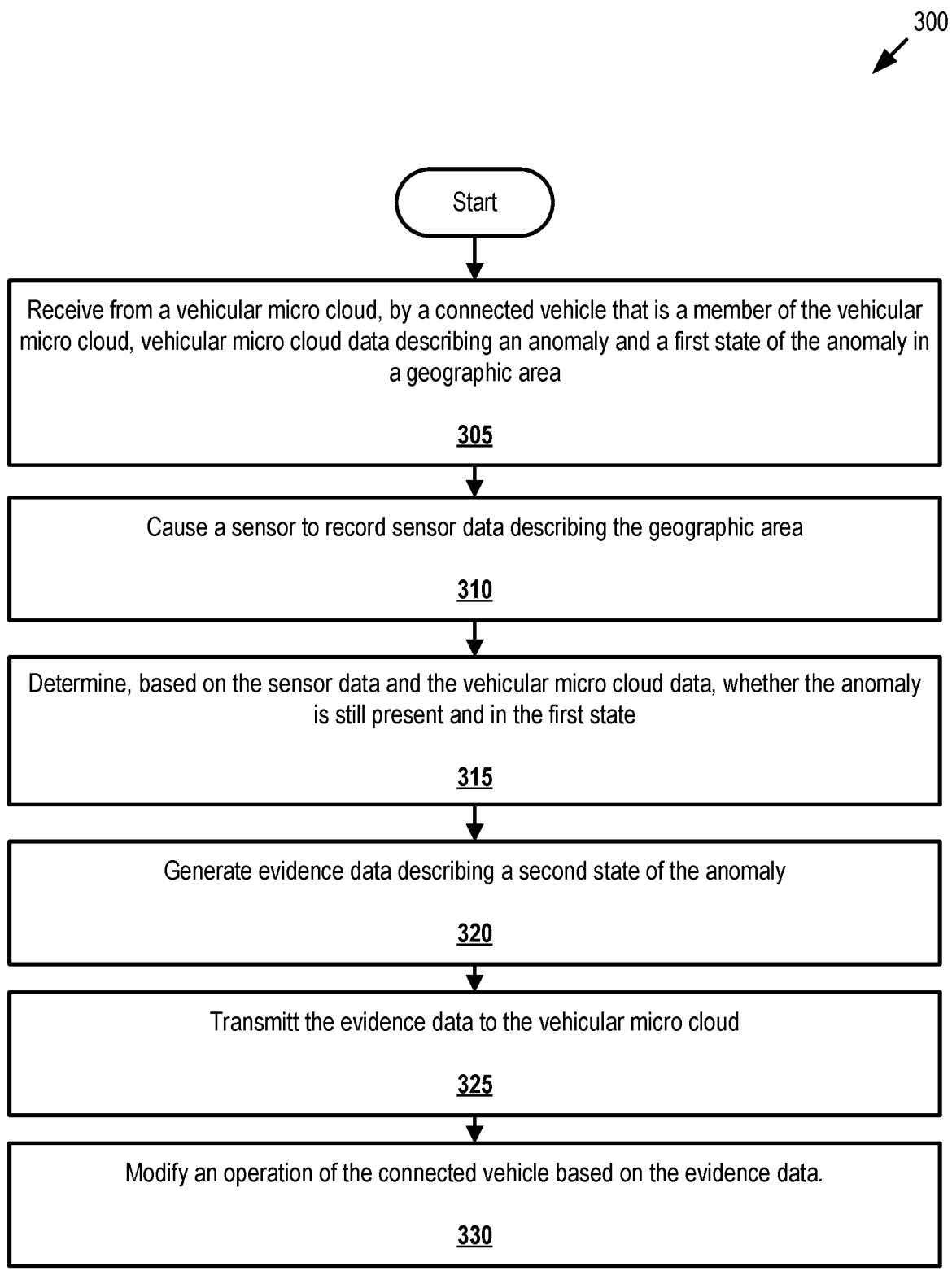
FIG. 3 is a flowchart of an example method for re-identification and revocation of misbehaving vehicles according to some embodiments.

In some embodiments, the update system that executes a method as described herein (e.g., the example general method described above, or some other method such as the method 300 depicted in FIG. 3) is an element of a hub or a hub vehicle. For example, the vehicular micro cloud formed by the update system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the roadside unit 151 is the hub of the vehicular micro cloud 194.

In some embodiments, the update system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most memory most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the update system is operable to provide its functionality to operating environments and network architectures that do not include a server. Use of servers is problematic because they create latency. For example, some prior art systems require that groups of vehicles relay all their messages to one another through a server. By comparison, the use of server is an optional feature in for the update system. For example, the update client is an element of a roadside unit that includes a communication unit 145 but not a server. In another example, the update client is an element of another vehicle such as one of the remote vehicles 124.

In some embodiments, the update system is operable to provide its functionality even though the vehicle which includes the update system does not have a Wi-Fi antenna as part of its communication unit. By comparison, some of the existing solutions require the use of a Wi-Fi antenna in order to provide their functionality. Because the update system does not require a Wi-Fi antenna, it is able to provide its functionality to more vehicles, including older vehicles without Wi-Fi antennas.

In some embodiments, the update system is operable to provide its functionality even though the vehicle which includes the update system does not have a V2X radio as part of its communication unit. By comparison, some of the existing solutions require the use of a V2X radio in order to provide their functionality. Because the update system does not require a V2X radio, it is able to provide its functionality to more vehicles, including older vehicles without V2X radios.

In some embodiments, the update system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the update system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the update system manages the vehicular micro cloud so that it is accessible for membership by vehicles which do not have V2V communication capability. This is beneficial because it ensures that legacy vehicles have access to the benefits provided by the vehicular micro cloud. The existing approaches do not provide this functionality.

In some embodiments, the update system is configured so that a particular vehicle (e.g., the ego vehicle) is pre-designated by a vehicle manufacturer to serve as a hub vehicle for any vehicular micro cloud that it joins. The existing approaches do not provide this functionality.

The existing solutions generally do not include vehicular micro clouds. Some groups of vehicles (e.g., cliques) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one. Accordingly, any group of vehicles that includes a server or whose functionality incorporates a server is not a vehicular micro cloud as this term is used herein.

In some embodiments, a vehicular micro cloud is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of the methods described herein (e.g., the first example general method described above, the second example general method described above, or the method depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

A vehicular micro cloud is responsible to doing computational analysis itself using the onboard vehicle computers of its members. A group of vehicles which relies on a cloud server for its computational analysis, or the difficult parts of its computational analysis, is not a vehicular micro cloud. Although FIG. 1 depicts a server in an operating environment that includes the update system, the server is an optional feature of the operating environment. An example of a preferred embodiment of the update system does not include the server in the operating environment which includes the update system.

In some embodiments, the update system enables a group of vehicles to perform computationally expensive tasks that could not be completed by any one vehicle in isolation.

Cellular Vehicle to Everything (C-V2X)

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth® message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of the GPS data according to some embodiments includes the GPS data 193 depicted in FIG. 1. An example of a standard-compliant GPS unit according to some embodiments includes the standard-compliant GPS unit 151 depicted in FIG. 1.

In some embodiments, the connected vehicle described herein, and depicted in FIG. 1, includes a V2X radio instead of a DSRC radio. In these embodiments, all instances of the term SRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the update system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

Vehicular Network

The update system and the update client utilize a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the update system includes software installed in an onboard unit of a connected vehicle. This software is the "update system" described herein.

An example operating environment for the embodiments described herein includes an ego vehicle and, optionally, one or more remote vehicles. The ego vehicle the remote vehicle are connected vehicles having communication units that enable them to send and receive wireless messages via one or more vehicular networks. In some embodiments, the ego vehicle and the remote vehicle include an onboard unit having an update system stored therein. An example of a preferred embodiment of the update system includes a serverless operating environment. A serverless operating environment is an operating environment which includes at least one update system and does not include a server.

In some embodiments, the update system includes code and routines that are operable, when executed by a processor of the onboard unit, to cause the processor to execute one or more of the steps of one or more of the following: the example general method; and the method 300 depicted in FIG. 3.

In some embodiments, this application is related to U.S. patent application Ser. No. 15/644,197 filed on Jul. 7, 2017 and entitled "Computation Service for Mobile Nodes in a Roadway Environment," the entirety of which is hereby incorporated by reference.

Example Operative Environment

Embodiments of the update system are now described. Referring now to FIG. 1, depicted is a block diagram illustrating an operating environment 100 for an update system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123"); an Nth remote vehicle 124 (where "N" refers to any positive whole number greater than one); a roadside unit 151; and a cloud server 103. These elements are communicatively coupled to one another via a network 105. These elements of the operating environment 100 are depicted by way of illustration. In practice, the operating environment 100 may include one or more of the elements depicted in FIG. 1. The Nth remote vehicle 124 may be referred to as a remote vehicle 124.

The operating environment 100 also includes the roadway environment 140. The roadway environment 140 was described above, and that description will not be repeated here.

In some embodiments, one or more of the ego vehicle 123, the remote vehicle 124, and the network 105 are elements of a vehicular micro cloud 194. The vehicular micro cloud 194 is depicted in FIG. 1 with a dashed line to indicate that it is an optional element of the operating environment 100. The remote vehicle 124 is also depicted with a dashed line in FIG. 1 to indicate that it is an optional feature of the operating environment 100.

The cloud server 103 is depicted with a dashed line to indicate that it is an optional feature of the operating environment 100. As depicted, the roadside unit 151 includes an edge server 104.

In some embodiments, the ego vehicle 123, the remote vehicle 124, the edge server 104, and the cloud server 103 include similar elements. For example, each of these elements of the operating environment 100 include their own processor 125, bus 121, memory 127, communication unit 145, processor 125, sensor set 126, onboard unit 139 (not included in the edge server 104 or the cloud server 103), standard-compliant GPS unit 151 (not included in the edge server 104 or the cloud server 103), and update system 199. These elements of the ego vehicle 123, the remote vehicle 124, the edge server 104, and the cloud server 103 provide the same or similar functionality regardless of whether they are included in the ego vehicle 123, the remote vehicle 124, the edge server 104, and the cloud server 103. Accordingly, the descriptions of these elements will not be repeated in this description for each of the ego vehicle 123, the remote vehicle 124, the edge server 104, and the cloud server 103.

In the depicted embodiment, the ego vehicle 123, the remote vehicle 124, the edge server 104, and the cloud server 103 store similar digital data.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference.

In some embodiments, the vehicular micro cloud 194 is a stationary vehicular micro cloud or a mobile vehicular micro cloud. For example, each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, the terms a "vehicular micro cloud" and a "micro-vehicular" cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member."

In some embodiments, the memory 127 of one or more of the endpoints stores member data. The member data is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data describes logical associations between endpoints which are a necessary component of the vehicular micro cloud 194 and serves the differentiate the vehicular micro cloud 194 from a mere V2X network. In some embodiments, a vehicular micro cloud 194 must include a hub vehicle and this is a further differentiation from a vehicular micro cloud 194 and a V2X network or a group or clique of vehicles which is not a vehicular micro cloud 194.

In some embodiments, the vehicular micro cloud 194 does not include a hardware server. Accordingly, in some embodiments the vehicular micro cloud 194 may be described as serverless. In some embodiments, the vehicular micro cloud 194 includes a server. For example, in some embodiments the edge server 104 is the hub of the vehicular micro cloud 194.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote vehicle 124 are C-V2X equipped vehicles. For example, the ego vehicle 123 includes a standard-compliant GPS unit 151 that is an element of the sensor set 126 and a C-V2X radio that is an element of the communication unit 145. The network 105 may include a C-V2X communication channel shared among the ego vehicle 123 and a second vehicle such as the remote vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105. For example, the ego vehicle 123 transmits and receives C-V2X messages via the network 105.

The ego vehicle 123 includes one or more of the following elements: a processor 125; a sensor set 126; a standard-compliant GPS unit 151; a vehicle control system 151; a communication unit 145; an onboard unit 139; a memory 127; and an update system 199. These elements may be communicatively coupled to one another via a bus 121. In some embodiments, the communication unit 145 includes a C-V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an advanced driver assistance system ("ADAS") or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the update system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 151); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record sensor data 195 that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. The sensor data may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the update system 199 based on analysis of the sensor data which is recorded by the ego vehicle 123 and/or one or more of the vehicular micro cloud 194.

In some embodiments, the sensors of the sensor set 126 are operable to collect sensor data 195. The sensors of the sensor set 126 include any sensors that are necessary to measure and record the measurements described by the sensor data 195. In some embodiments, the sensor data 195 includes any sensor measurements that are necessary to generate the other digital data stored by the memory 127. In some embodiments, the sensor data 195 includes any sensor measurements that are necessary for the update system 199 and/or the update client 198 to provide its functionality as described herein with reference to the example general method and the method 300 depicted in FIG. 3.

The sensor data 195 includes digital data that describes any measurement that is taken by one or more of the sensors of the sensor set 126.

The standard-compliant GPS unit 151 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 151 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 151 is compliant with one or more standards governing V2X communications but does not provide GPS measurements that are lane-level accurate.

In some embodiments, the standard-compliant GPS unit 151 includes any hardware and software necessary to make the ego vehicle 123 or the standard-compliant GPS unit 151 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 151 is operable to provide GPS data 193 describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data 193 so accurately that a precise lane of travel of the ego vehicle 123 may be accurately determined based on the GPS data 193 for this vehicle 123 as provided by the standard-compliant GPS unit 151.

An example process for generating GPS data 193 describing a geographic location of an object (e.g., a queue, the ego vehicle 123, the remote vehicle 124, or some other object located in a roadway environment) is now described according to some embodiments. In some embodiments, the update system 199 include code and routines that are operable, when executed by the processor 125, to cause the processor to: analyze (1) GPS data describing the geographic location of the ego vehicle 123 and (2) sensor data describing the range separating the ego vehicle 123 from an object and a heading for this range; and determine, based on this analysis, GPS data describing the location of the object. The GPS data 193 describing the location of the object may also have lane-level accuracy because, for example, it is generated using accurate GPS data of the ego vehicle 123 and accurate sensor data describing information about the object.

In some embodiments, the standard-compliant GPS unit 151 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 151 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the update system 199 described herein may analyze the GPS data provided by the standard-compliant GPS unit 151 and determine what lane the ego vehicle 123 is traveling in based on the relative positions of two or more different vehicles (one of which is, for example, the ego vehicle 123) traveling on a roadway at the same time.

By comparison to the standard-compliant GPS unit 151, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the update system 199 to determine the lane of travel of the ego vehicle 123. This measurement improves the accuracy of the GPS data describing the location of lanes used by the ego vehicle 123 when the update system 199 is providing its functionality.

In some embodiments, the memory 127 stores two types of GPS data 193. The first is GPS data 193 of the ego vehicle 123 and the second is GPS data of one or more objects (e.g., the remote vehicle 124 or some other object in the roadway environment). The GPS data 193 of the ego vehicle 123 is digital data that describes a geographic location of the ego vehicle 123. The GPS data 193 of the objects is digital data that describes a geographic location of an object. One or more of these two types of GPS data 193 may have lane-level accuracy. In some embodiments, one or more of these two types of GPS data 193 are described by the sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the update system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369, 262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the example general method or below with reference to the method 300 depicted in FIG. 3 are transmitted by the C-V2X radio on the upper 30 MHz of the 5.9 GHz band (i.e., 5.895-5.925 GHz) as directed by the update system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSM messages which are regularly broadcast by the V2X radio (e.g., at an interval of once every 0.10 seconds).

In some embodiments, the V2X radio includes any hardware or software which is necessary to make the ego vehicle 123 compliant with the DSRC standards. In some embodiments, the standard-compliant GPS unit 151 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the evidence data 191; the rules data 192; the GPS data 193; the micro cloud data 171; the sensor data 195; the threshold data 196; and the vehicle data 197. These elements were described above with reference to the example general method, and so, those descriptions will not be repeated here. In some embodiments, the memory 127 stores some or all of the digital data described herein. In some embodiments, the memory 127 stores any digital data that is necessary for the update system 199 to provide its functionality.

In some embodiments, the ego vehicle 123 includes a vehicle control system. A vehicle control system includes one or more ADAS systems or an autonomous driving system.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system of the ego vehicle 123 that is operable to identify one or more factors (e.g., using one or more onboard vehicle sensors) affecting the ego vehicle 123 and modify (or control) the operation of the ego vehicle to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle may have a LKA system installed and operational in an ego vehicle may detect, using one or more external cameras of the ego vehicle, an event in which the ego vehicle is near passing a center yellow line which indicates a division of one lane of travel from another lane of travel on a roadway. The LKA system may provide a notification to a driver of the ego vehicle that this event has occurred (e.g., an audible noise or graphical display) or take action to prevent the ego vehicle from actually passing the center yellow line such as making the steering wheel difficult to turn in a direction that would move the ego vehicle over the center yellow line or actually moving the steering wheel so that the ego vehicle is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

In some embodiments, the update system 199 includes code and routines that are operable, when executed by the processor 125, to execute one or more steps of the method 300 described below with reference to FIG. 3. In some embodiments, the update system 199 includes code and routines that are operable, when executed by the processor 125, to execute one or more steps of the example general method described above.

Figure 4:
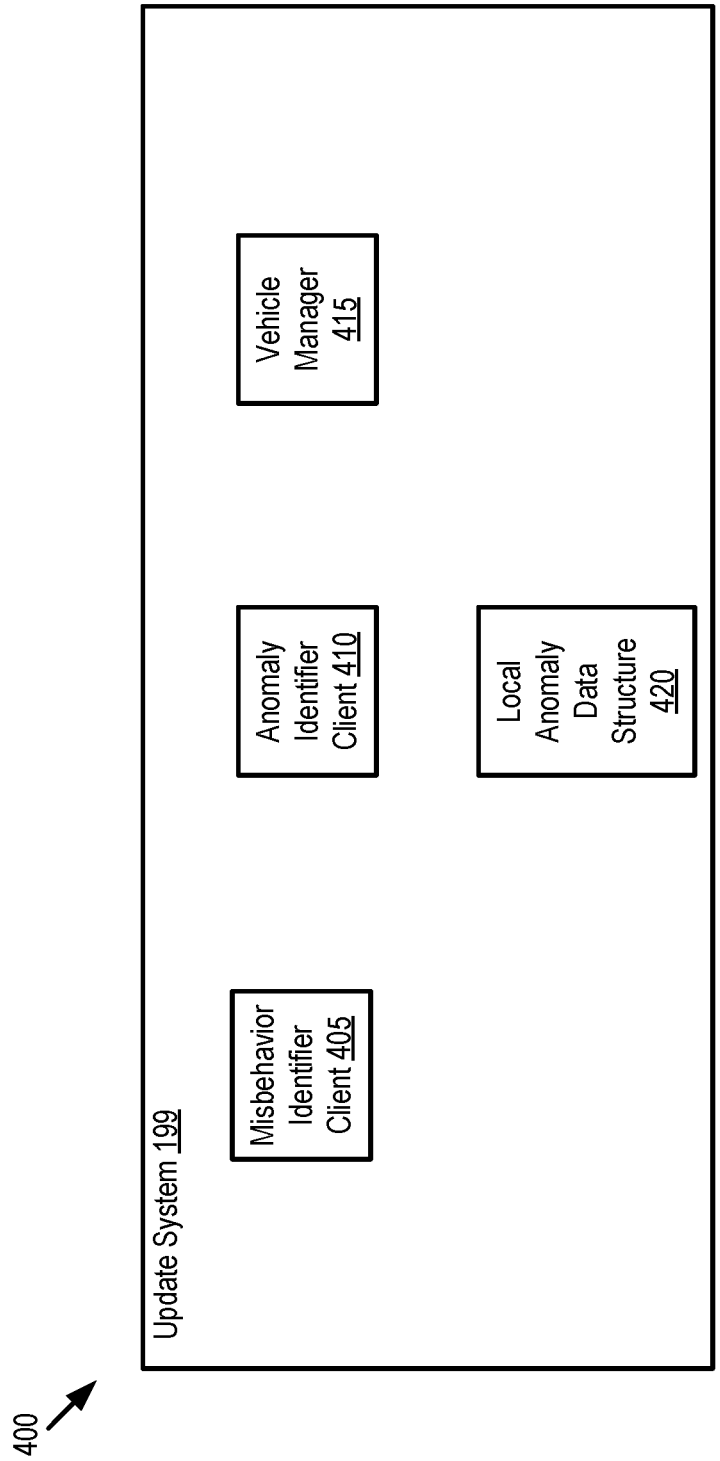
FIG. 4 is a block diagram of an example update system according to some embodiments.

An example embodiment of the update system 199 is depicted in FIG. 4. This embodiment is described in more detail below.

In some embodiments, the update system 199 is an element of the onboard unit 139 or some other onboard vehicle computer.

In some embodiments, the update system 199 is implemented using hardware including a field-programmable gate array ("FPGA") or an application-specific integrated circuit ("ASIC"). In some other embodiments, the update system 199 is implemented using a combination of hardware and software.

The remote vehicle 124 includes elements and functionality which are similar to those described above for the ego vehicle 123, and so, those descriptions will not be repeated here.

In some embodiments, the ego vehicle 123, the remote vehicle, and the roadside unit 151 are located in a roadway environment 140. The roadway environment is a portion of the real-world that includes a roadway, the ego vehicle 123 and the remote vehicle 124. The roadway environment 140 may include other elements such as the vehicular micro cloud 194, roadway signs, environmental conditions, traffic, etc. The roadway environment 140 includes some or all of the tangible and/or measurable qualities described above with reference to the sensor data.

In some embodiments, the real-world includes the real of human experience comprising physical objects and excludes artificial environments and "virtual" worlds such as computer simulations.

In some embodiments, the roadway environment 140 includes a roadside unit 151 that in includes an edge server 104. The edge server 104 is a connected processor-based computing device that is not a member of the vehicular micro cloud 194 and includes an instance of the update system 199 and a memory 127.

In some embodiments, the edge server 104 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the update system 199 and a non-transitory memory that stores some or all of the digital data that is stored by the memory 127 of the ego vehicle 123 or otherwise described herein. The edge server 104 may include a backbone network.

The edge server 104 includes an instance of the update client 198. In some embodiments, the update client 198 includes code and routines that are operable, when executed by the processor 125, to execute one or more steps of the method 300 described below with reference to FIG. 3. In some embodiments, the update client 198 includes code and routines that are operable, when executed by the processor 125, to execute one or more steps of the example general method described above.

Figure 5:
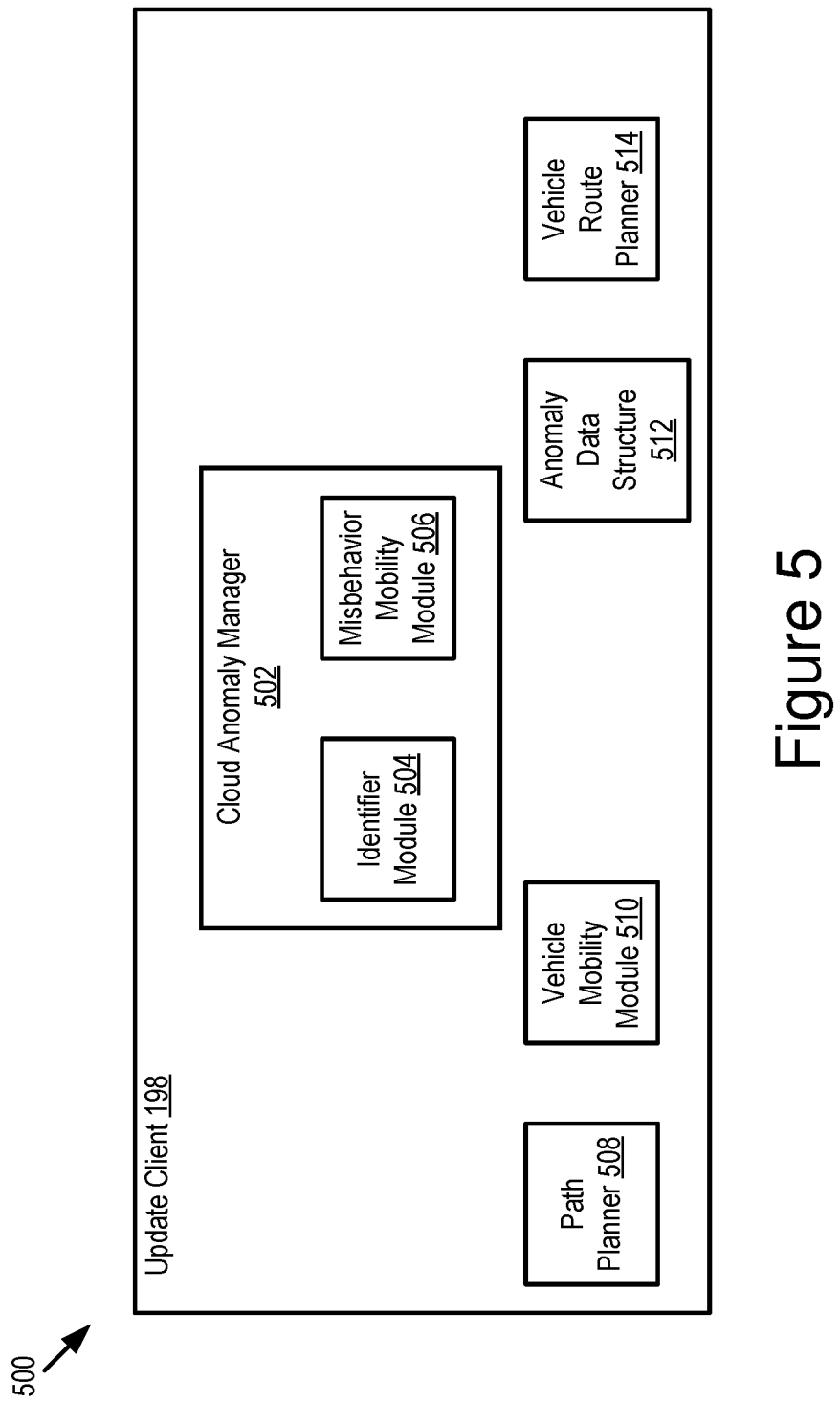
FIG. 5 is a block diagram of an example update client according to some embodiments.

An example embodiment of the update client 198 is depicted in FIG. 5. This embodiment is described in more detail below with reference to FIG. 5.

In some embodiments, the update client 198 is implemented using hardware including an FPGA or an ASIC. In some other embodiments, the update client 198 is implemented using a combination of hardware and software.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote vehicle 124, etc.), and optionally devices such as a roadside unit 151, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the update system 199 includes encryption keys for encrypting wireless messages and decrypting the wireless messages described herein.

Figure 2:
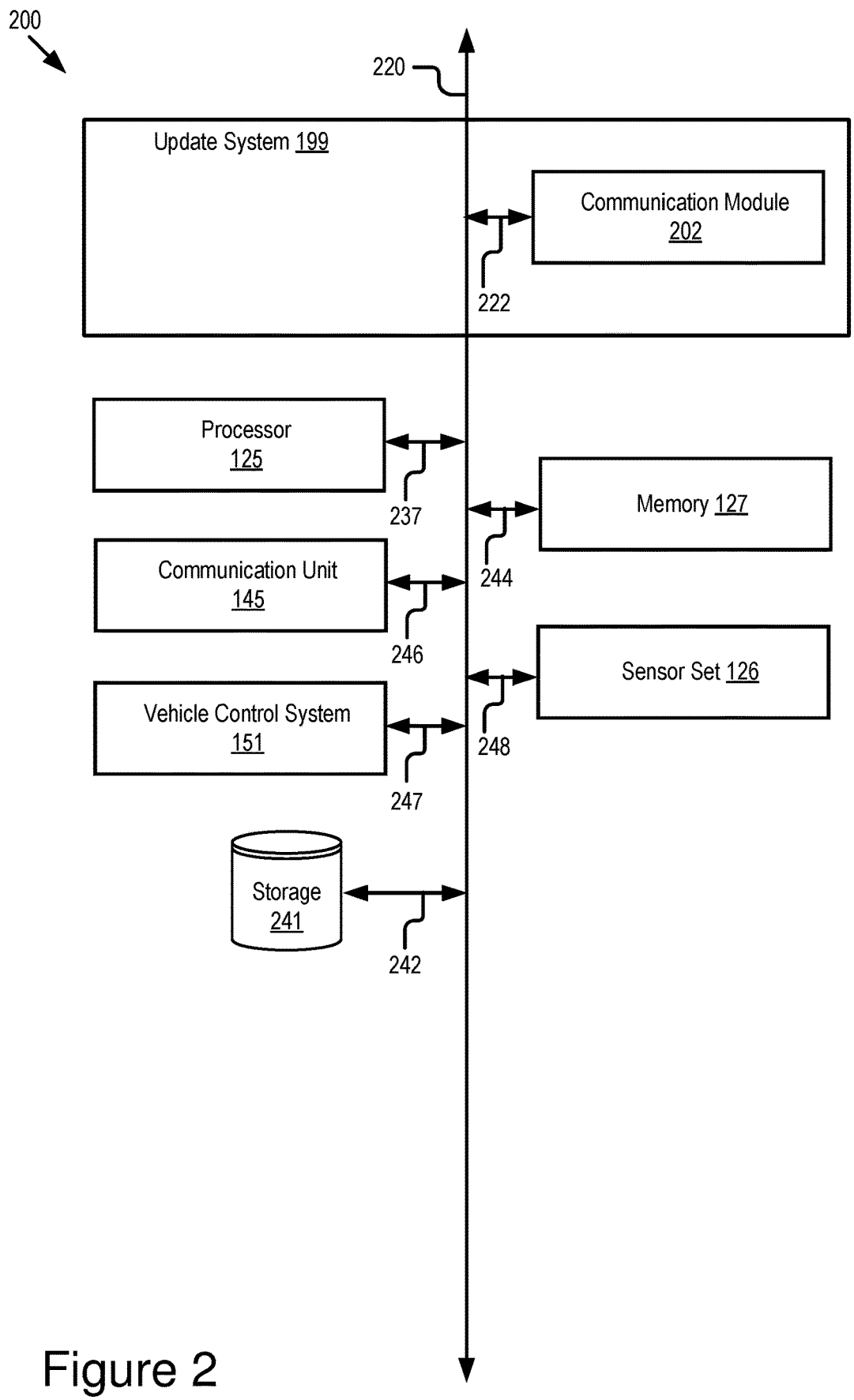
FIG. 2 is a block diagram illustrating an example computer system including an update system according to some embodiments.

Referring now to FIG. 2, depicted is a block diagram illustrating an example computer system 200 including an update system 199 according to some embodiments.

In some embodiments, the computer system 200 may include a special-purpose computer system that is programmed to perform one or more steps of one or more of the method 300 described herein with reference to FIG. 3. In some embodiments, the computer system 200 may include a special-purpose computer system that is programmed to perform one or more steps of one or more of the first example general method described above and the second general example described above.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the update system 199; a processor 125; a communication unit 145; a vehicle control system 151; a storage 241; and a memory 127. The components of the computer system 200 are communicatively coupled by a bus 220.

In some embodiments, the computer system 200 includes additional elements such as those depicted in FIG. 4.

In the illustrated embodiment, the processor 125 is communicatively coupled to the bus 220 via a signal line 237. The communication unit 145 is communicatively coupled to the bus 220 via a signal line 246. The vehicle control system 151 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 151; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the update system 199 includes code and routines that are operable, when executed by the processor 125, to cause the processor 125 to execute one or more steps of the method 300 described herein with reference to FIG. 3. In some embodiments, the update system 199 includes code and routines that are operable, when executed by the processor 125, to cause the processor 125 to execute one or more steps of the example general method described above.

In the illustrated embodiment shown in FIG. 2, the update system 199 includes a communication module 202.

The communication module 202 can be software including routines for handling communications between the update system 199 and other components of the computer system 200. In some embodiments, the communication module 202 can be a set of instructions executable by the processor 125 to provide the functionality described below for handling communications between the update system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the update system 199 and stores the data in one or more of the storage 241 and the memory 127.

In some embodiments, the communication module 202 may handle communications between components of the update system 199 or the computer system 200.

Referring now to FIG. 3, depicted is a flowchart of an example method 300. The method 300 includes step 305, step 310, step 315, step 320, step 325, and step 330 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Example differences in technical effect between the method 300 and the prior art are described below. These examples are illustrative and not exhaustive of the possible differences.

In some embodiments, a first difference in technical effect is that in the method 300 performs its calculations locally on an ego vehicle, and as such, does not utilize collaborative computing.

Cooperative computing includes multiple endpoints of the network collaboratively breaking a large task down into smaller processes, different endpoints individually executing different processes in parallel to determine results for their individual processes, and exchanging V2X messages with one another sharing the results of their individual processes so that multiple endpoints work together to complete the large task in parallel. This approach is undesirable because it creates latency (e.g., the V2X messages are time consuming). Accordingly, the method 300 is non-inclusive of collaborative computing.

In some embodiments, a second difference in technical effect is that the method 300 executes tests to determine whether anomalies are still present, instead of blindly trusting that the anomalies described by vehicular micro cloud data are actually accurate.

In some embodiments, a third difference in technical effect is that the method 300 collects sensor data and updates the vehicular micro cloud data stored by a vehicular micro cloud so that the vehicular micro cloud data is refreshed and maintains accuracy over time.

Referring now to FIG. 4, depicted is a block diagram of an embodiment 400 of an example of the update system 199. As depicted, the update system 199 includes a misbehavior identifier client 405, an anomaly identifier client 410, a vehicle manager 415; and a local anomaly data structure 420.

In some embodiments, the vehicle manager 415 includes code and routines that are operable, when executed by a processor, to cause the processor to determine that the ego vehicle requires assistance from another vehicle to determine if the micro cloud data is accurate and then facilitate the receipt of the evidence data of one or more remote vehicles in order to determine whether an anomaly has changed its state.

In some embodiments, the vehicle manager 415 includes code and routines that are operable, when executed by a processor, to cause the processor to provide the following functionality: maintenance of intra-vehicular wireless links; sharing evidence data with other vehicles; and collecting evidence data from other vehicles.

In some embodiments, the misbehavior identifier client 405 and the anomaly identifier client 410 are elements of an onboard unit of an ego vehicle and used for verifying whether an anomaly described by the micro cloud data or the local anomaly data structure 420 are still correct.

In some embodiments, the misbehavior identifier client 405 includes code and routines that are operable, when executed by a processor, to cause the processor to analyze the currently generated sensor data and the micro cloud data received from the update client (and stored in the local anomaly data structure 420) to determine whether the a presence of an object in the roadway environment that was previously identified as behaving anomalous.

In some embodiments, the misbehavior identifier client 405 provides this functionality by: determining a set of distinguished characteristics of misbehavior from one or more of the rules and object priors (e.g., rules data); comparing the distinguished characteristics of misbehavior to the sensor measurements of the sensor set to identify instances where an object described by the sensor data is demonstrating anomalous behavior (e.g., evidence information, which is different than evidence data); generate the evidence information as needed based on the comparison of the sensor data to the rules data; and provide the evidence information to the anomaly identifier client 410.

In some embodiments, the anomaly identifier client 410 includes code and routines that are operable, when executed by a processor, to cause the processor to provide some or all of the following functionality: compare the evidence information to the micro cloud data to verify or re-verify whether an object described by the micro cloud data is still demonstrating anomalous behavior as described by the micro cloud data; generate evidence data based on this comparison; determine updated timestamp and GPS data for the object that is demonstrating anomalous behavior; add the timestamp and GPS data to the evidence data if the object is demonstrating anomalous behavior; if the object is not demonstrating anomalous behavior, generate evidence data that revokes the classification of the object as behaving anomalous; cause the communication unit to transmit the evidence data to the edge server or the cloud server.

Referring now to FIG. 5, depicted is a block diagram of an embodiment 500 of an example of the update client 198 according to some embodiments. As depicted, the update client includes the following elements: a cloud anomaly manager 502; a path planner 508; a vehicle mobility module 510; an anomaly data structure 512; and a vehicle route planner 514. The cloud anomaly manager 502 includes an identifier module 504 and a misbehavior mobility module 506.

In some embodiments, the anomaly data structure 512 is hosted by the edge server or the cloud server. The anomaly data structure 512 is a data structure that organizes, and stores instances of vehicle data and evidence data received from the members. In some embodiments, the anomaly data structure 512 organizes and stores instances of micro cloud data determined by the update client 198. In some embodiments, the anomaly data structure 512 is a database.

In some embodiments, the evidence data describes one or more of the following: a type of anomaly, conditions of anomaly, actions to take for that anomaly, road type where the anomaly is located, potential locations for the anomaly; and a unique identifier of the vehicles that provided each instance of evidence data.

In some embodiments, the update client 198 is operable to analyze the digital data stored in the anomaly data structure 512 and identify the misbehavior of an object which is the anomalous behavior and the object that is engaging in the misbehavior.

In some embodiments, the identifier module 504 includes code and routines that are operable, when executed by the processor, to cause the processor to analyze the digital data stored in the anomaly data structure 512 and identify which particular object within the roadway environment is responsible for misbehavior that is classified as anomalous behavior.

In some embodiments, the misbehavior mobility module 506 includes code and routines that are operable, when executed by the processor, to cause the processor to analyze the digital data stored in the anomaly data structure 512 and identify an instance of misbehavior by an object within the roadway environment which is classified as anomalous behavior by the misbehavior mobility module 506.

In some embodiments, the misbehavior mobility module 506 includes code and routines that are operable, when executed by the processor, to cause the processor to analyze the digital data stored in the anomaly data structure 512 and reclassify an object as no longer misbehaving or no longer present in the roadway environment.

In some embodiments, the vehicle data and the evidence data includes digital data that describes one or more of the following: the time when an object and/or object which is or was previously classified as exhibiting anomalous behavior was observed by a sensor; the location where the object and/or object which is or was previously classified as exhibiting anomalous behavior was observed by a sensor; and the type of misbehavior exhibited by the anomaly, if any.

In some embodiments, the anomaly data structure 512 is generated by the cloud anomaly manager 502 and distributed to members via the network using the communication unit of the server or roadside unit that hosts the update client 198.

In some embodiments, individual vehicles receive a V2X message including micro cloud data and/or the anomaly data structure 512 and then the update system 199 builds a local anomaly data structure 420 based on this digital data. The local anomaly data structure is a version of the anomaly data structure 512 that is stored locally on a vehicle that includes the update system 199 (e.g., the ego vehicle 123 or the remote vehicle 124). These update systems 199 then generate evidence data as described herein and update the local anomaly data structure 420 accordingly.

In some embodiments, the misbehavior mobility module 506 includes code and routines that are operable, when executed by the processor, to cause the processor to provide the following functionality to the update client 198: monitoring new instances of vehicle data and evidence data as they are received to track changes in state for vehicles or objects that were previously characterized as engaged in anomalous behavior; monitoring new instances of vehicle data and evidence data as they are received to track changes in state for vehicles that receive the benefit of the anomaly management service provided by the update client 198 (the functionality of the update client 198 is referred to herein as the anomaly management service); propagate the anomaly data structure 512 or the micro cloud data to vehicles possibly on way of anomalous behavior and request that these vehicles provide evidence data describing the state of the object which was previously demonstrating anomalous behavior; if match to anomalous behavior is found in the evidence data, then update the micro cloud data to describe new information about the object (i.e., location, current severity, etc.); if no match is found, then remove the entry in the anomaly data structure 512.

The vehicle data includes, among other things, mobility information for objects that are previously classified as demonstrating anomalous behavior. The mobility information is digital data that describes the location of the object, the time when the object was at that location, and the behavior of that object at that time. In some embodiments, the vehicle data also describes mobility information for the connected vehicle (e.g., the ego vehicle) that reports the vehicle data to the update client. In some embodiments, this mobility information includes digital data describing a future destination and the planned route for the connected vehicle.

The vehicle mobility module 510 includes code and routines that are operable, when executed by a processor, to cause the processor to monitor the mobility information for the connected vehicles that report the vehicle data to the update client (e.g., the ego vehicle); report this mobility information to the path planner 508 which, in some embodiments, determines new destinations, routes, and travel times for these connected vehicles; and instruct the path planner 508 to generate routes for connected vehicles that cause these vehicles to be proximate to objects demonstrating anomalous behavior so that these vehicles can verify whether this anomalous behaviors is still occurring.

In some embodiments, the vehicle route planner 514 includes code and routines that are operable, when executed by a processor, to cause the processor to search the mobility information for connected vehicles that are, or will be, on the way of objects that are demonstrating anomalous behavior and inform the vehicle mobility module 510 about the identity of these connected vehicles so that the vehicle mobility module 510 can instruct the path planner 508 about generating routes for these connected vehicles; select connected vehicles to receive micro cloud data based on their routes, resource requirements, etc.; select vehicle and/or subset of vehicles to share the anomaly evidence; and select policies for how these vehicles should behave in the presence of the anomalous behavior if any.

In some embodiments, the GPS data 193 is determined by a localization sensor of the sensor set. An example of a localization sensor according to some embodiments includes an inertial measurement unit.

Figure 6:
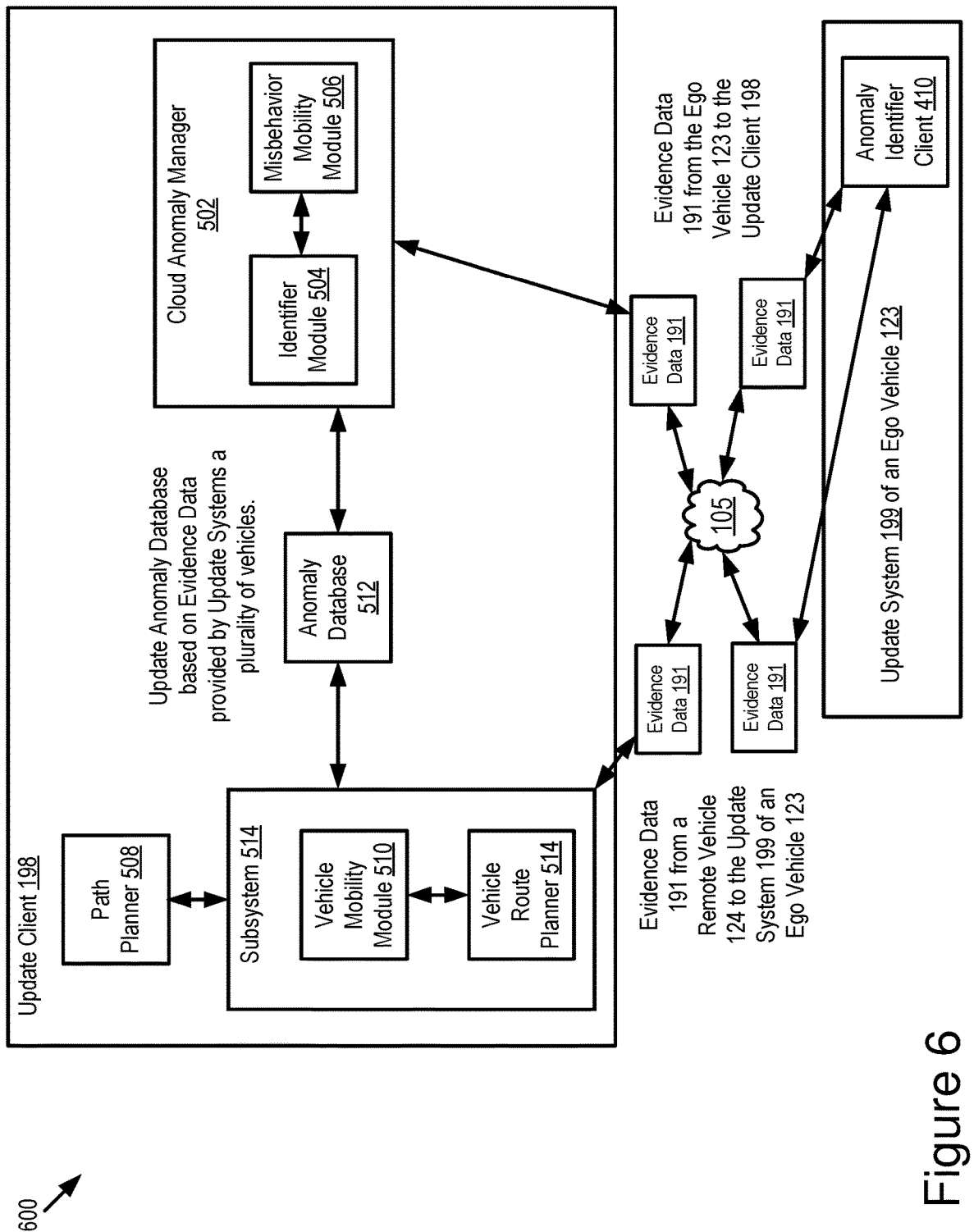
FIG. 6 is a block diagram of an example process flow for propagating evidence data according to some embodiments.

Referring now to FIG. 6, depicted is a block diagram of an example of a process flow 600 for propagating evidence data according to some embodiments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving from a vehicular micro cloud consisting of a plurality of members that satisfied a predetermined threshold of unused computing resources required to join the vehicular micro cloud, by a connected vehicle that is a member of the vehicular micro cloud, vehicular micro cloud data describing an anomaly and a first state of the anomaly in a geographic area, wherein the vehicular micro cloud provides an anomaly management service to the plurality of members via a plurality of Vehicle-to-Everything (V2X) communications exchanged among the plurality of members;
causing a sensor to record sensor data describing the geographic area;
determining, based on the sensor data and the vehicular micro cloud data, whether the anomaly is still present and in the first state;
generating evidence data describing a second state of the anomaly;
transmitting the evidence data to the vehicular micro cloud; and
modifying an operation of the connected vehicle based on the evidence data, and wherein the anomaly management service includes executing the method using onboard units local to the plurality of member vehicles.

2. The method of claim 1, wherein the first state includes the anomaly being present in the geographic area and the second state includes the anomaly not being present in the geographic area.

3. The method of claim 1, wherein the first state includes a first type of anomaly and the second state includes a second type of anomaly that is different than the first type.

4. The method of claim 1, wherein the first state includes a first type of the anomaly and the second state includes a second type of the anomaly that is different than the first type.

5. The method of claim 1, wherein the vehicular micro cloud does not include a vehicular ad hoc network.

6. The method of claim 1, wherein the evidence data is generated by only the connected vehicle so that the evidence data is generated without cooperative computing.

7. The method of claim 1, wherein transmitting the evidence data to the vehicular micro cloud includes revising the micro cloud data based on the evidence data and propagating the revised micro cloud data to members of the vehicular micro cloud.

8. The method of claim 1, wherein the connected vehicle is a leader of the vehicular micro cloud.

9. The method of claim 8, wherein the leader executes the method to benefit members of the vehicular micro cloud by solving a latency problem.

10. The method of claim 1, further comprising determining that execution of the method satisfies a threshold for latency for executing the method.

11. A computer program product included in at least one onboard vehicle computer for modifying an operation of a connected vehicle based on evidence data, the computer program product comprising computer code that is operable, when executed by the onboard vehicle computer, to cause the onboard vehicle computer to execute steps including:
receive from a vehicular micro cloud consisting of a plurality of members that satisfied a predetermined threshold of unused computing resources required to join the vehicular micro cloud, by a connected vehicle that is a member of the vehicular micro cloud, vehicular micro cloud data describing an anomaly and a first state of the anomaly in a geographic area, wherein the vehicular micro cloud provides an anomaly management service to the plurality of members via a plurality of Vehicle-to-Everything (V2X) communications exchanged among the plurality of members;
cause a sensor to record sensor data describing the geographic area;
determine, based on the sensor data and the vehicular micro cloud data, whether the anomaly is still present and in the first state;
generate evidence data describing a second state of the anomaly;
transmit the evidence data to the vehicular micro cloud; and
modify an operation of the connected vehicle based on the evidence data, and wherein the anomaly management service is provided using onboard vehicle computers local to the plurality of member vehicles.

12. The computer program product of claim 11, wherein the first state includes the anomaly being present in the geographic area and the second state includes the anomaly not being present in the geographic area.

13. The computer program product of claim 11, wherein the first state includes a first type of anomaly and the second state includes a second type of anomaly that is different than the first type.

14. The computer program product of claim 11, wherein the first state includes a first type of the anomaly and the second state includes a second type of the anomaly that is different than the first type.

15. The computer program product of claim 11, wherein the vehicular micro cloud is does not include a vehicular ad hoc network.

16. The computer program product of claim 11, wherein the evidence data is generated by only the connected vehicle so that the evidence data is generated without cooperative computing.

17. The computer program product of claim 11, wherein transmitting the evidence data to the vehicular micro cloud includes revising the micro cloud data based on the evidence data and propagating the revised micro cloud data to members of the vehicular micro cloud.

18. The computer program product of claim 11, wherein the connected vehicle is a leader of the vehicular micro cloud.

19. The computer program product of claim 18, wherein the leader executes the steps to benefit members of the vehicular micro cloud.

20. A system included in a connected vehicle for modifying an operation of the connected vehicle based on evidence data, the system comprising:
 a processor;
 a communication unit communicatively coupled to the processor; and
 a non-transitory memory communicatively coupled to the processor and the communication unit, wherein the non-transitory memory stores executable code that is operable, when executed by the processor, to cause the processor to:
 receive from a vehicular micro cloud consisting of a plurality of members that satisfied a predetermined threshold of unused computing resources required to join the vehicular micro cloud, by a connected vehicle that is a member of the vehicular micro cloud, vehicular micro cloud data describing an anomaly and a first state of the anomaly in a geographic area, wherein the vehicular micro cloud provides an anomaly management service to the plurality of members via a plurality of Vehicle-to-Everything (V2X) communications exchanged among the plurality of members;
 cause a sensor to record sensor data describing the geographic area;
 determine, based on the sensor data and the vehicular micro cloud data, whether the anomaly is still present and in the first state;
 generate evidence data describing a second state of the anomaly;
 transmit the evidence data to the vehicular micro cloud; and
 modify an operation of the connected vehicle based on the evidence data, and wherein the anomaly management service is provided using processors local to the plurality of member vehicles.

* * * * *